United States Patent [19]
Ramseyer et al.

[11] Patent Number: 5,698,777
[45] Date of Patent: Dec. 16, 1997

[54] CAMSHAFT REVOLUTION SENSING ASSEMBLY

[75] Inventors: Mark S. Ramseyer, Livonia, Mich.; Rudolf Bettelheim, Buda, Tex.

[73] Assignees: Ford Motor Company, Dearborn, Mich.; Motorola, Inc., Schaumburg, Ill.

[21] Appl. No.: 596,858

[22] Filed: Feb. 5, 1996

[51] Int. Cl.$^6$ .................................................. G01M 15/00
[52] U.S. Cl. .......................... 73/116; 123/419; 123/436; 364/431.07
[58] Field of Search ........................ 73/116, 117.2, 73/117.3; 123/419, 436; 364/431.07

[56] References Cited

U.S. PATENT DOCUMENTS

| | | | |
|---|---|---|---|
| 4,158,305 | 6/1979 | Shipley | 73/117.3 |
| 4,782,692 | 11/1988 | Peden et al. | 73/117.3 |
| 4,788,956 | 12/1988 | Suzuki et al. | 73/116 |
| 5,041,979 | 8/1991 | Hirka et al. | 73/116 |
| 5,377,535 | 1/1995 | Angermaier et al. | 73/116 |

FOREIGN PATENT DOCUMENTS

| | | |
|---|---|---|
| 270313 | 11/1987 | European Pat. Off. . |
| 584566 | 7/1993 | European Pat. Off. . |
| 3017973 | 11/1981 | Germany . |
| 4210559 | 10/1993 | Germany . |
| 8600415 | 1/1986 | WIPO . |

*Primary Examiner*—George M. Dombroske
*Attorney, Agent, or Firm*—Peter Abolins, Esq.; Roger L. May, Esq.

[57] ABSTRACT

A camshaft revolution sensing assembly for identifying a revolution of a camshaft, having a plurality of teeth, of an internal combustion engine of an automotive vehicle includes a camshaft sensor for sensing revolutions of a camshaft by sensing each of the teeth as they rotate therepast and producing a camshaft sensor output, a subtracting device operatively connected to the camshaft sensor, the subtracting device subtracting each time the camshaft sensor senses one of the teeth rotating therepast, and a signal generator operatively connected to the subtracting device wherein the signal generator generates a signal indicating the subtracting device has subtracted to a predetermined value.

10 Claims, 2 Drawing Sheets

CAMSHAFT REVOLUTION SENSING ASSEMBLY

BACKGROUND OF THE INVENTION

1. Field of the Invention

The present invention relates generally to a revolution sensing assembly and, more specifically, to a revolution sensing assembly for a camshaft of an internal combustion engine of an automotive vehicle.

2. Description of the Related Art

As the sophistication of the internal combustion engine of a vehicle increases, so too must the control thereof. To maximize the control of the internal combustion engine, a requisite is the knowledge of the position, orientation, and number of revolutions of the parts of the automotive vehicle, i.e., the camshaft, pistons, crankshaft, and the like.

Most internal combustion engines operate using a four (4) stroke cycle which covers two (2) engine revolutions. As the standards of higher sophistication are demanded, full synchronization of the engine cycle, not just the engine revolution, is required. Currently, there is only one fixed implementation that depends on software. More specifically, the hardware and software must change if a different sensor or sensor-type is used.

SUMMARY OF THE INVENTION

Accordingly, the present invention is a camshaft revolution sensing assembly for identifying a revolution of a camshaft, having at least one tooth of an internal combustion engine of an automotive vehicle. The camshaft revolution sensing assembly includes a camshaft sensor for sensing the revolution of the camshaft by sensing each of the teeth as each rotates therepast. The camshaft sensor produces a camshaft sensor output. The camshaft revolution sensing assembly also includes a subtracting device which is operatively connected to the camshaft sensor. The subtracting device subtracts each time the camshaft sensor senses a tooth rotating therepast. The camshaft revolution sensing assembly further includes a signal generator operatively connected to the subtracting device. The signal generator generates a signal indicating the subtracting device has subtracted to a predetermined value.

One advantage associated with the present invention is the ability to determine which revolution the camshaft is rotating through. Another advantage of the present invention is the ability to determine in which revolution the camshaft is rotating from a plurality of inputs allowing the internal combustion engine to continue to operate even if one of the sensors is not operating. Yet another advantage of the present invention is the ability to use the same hardware for a plurality of sensor types without having to change hardware or software. Yet another advantage still is the ability to override the sensor and to control the inputs. The revolution information is maintained internally and does not require a camshaft sensor.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
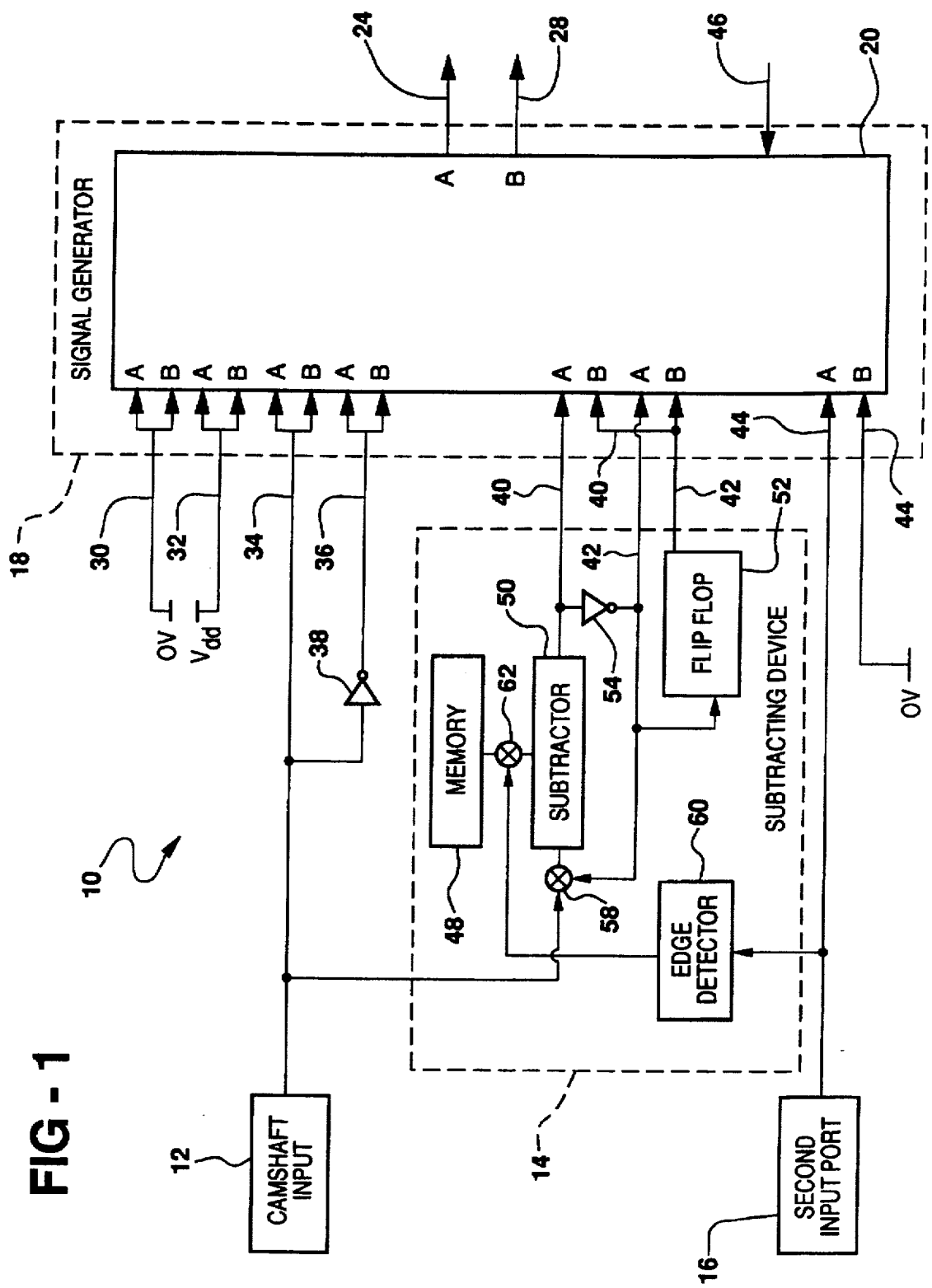
FIG. 1 is a schematic block diagram of one embodiment of a camshaft revolution sensing assembly, according to the present invention.

One embodiment of the present invention, a camshaft revolution sensing assembly, is generally indicated at 10 in FIG. 1. The camshaft revolution sensing assembly 10 identifies a revolution of a camshaft (not shown) of an internal combustion engine of an automotive vehicle (neither shown). It should be appreciated that the camshaft has a plurality of teeth or a similar target as is known in the art.

The camshaft revolution sensing assembly includes a camshaft sensor 12. The camshaft sensor 12 senses a revolution of the camshaft by sensing each tooth as it rotates therepast. Although any type of sensor may be used in combination with the camshaft, in one embodiment of the camshaft revolution sensing assembly, the camshaft sensor 12 is a variable reluctance sensor, wherein each of the teeth interrupt the flux lines of the magnetic field created by the camshaft sensor 12 indicating the passing of a tooth. It may be appreciated that additional camshaft sensors, although not shown or described, may be used in place of or in addition to the camshaft sensor 12.

The output of the camshaft sensor 12 is an input for a subtracting device 14. The subtracting device 14 is operatively connected to the camshaft sensor 12. The subtracting device 14 subtracts each time the camshaft sensor 12 sensing a tooth rotating therepast. In one embodiment the subtracting device subtracts a unitary value (1).

The camshaft revolution sensing assembly 10 further includes an input port 16 for receiving an input signal independent of the output of the camshaft sensor 12. In one embodiment, the input signal received by the second input port 16 is a rotation signal generated from another portion of an engine tracking design.

Figure 2:
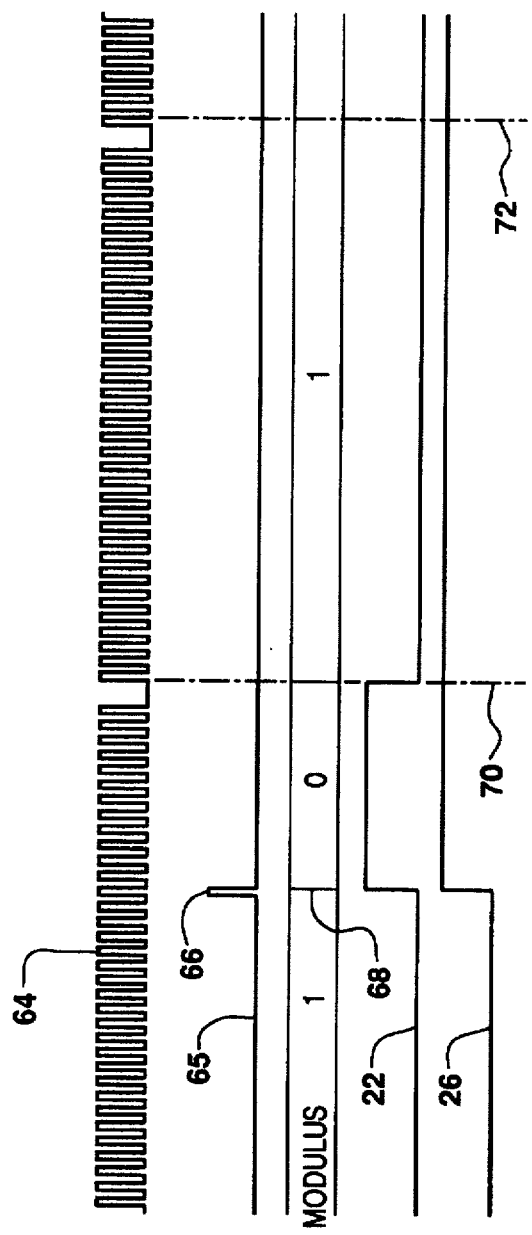
FIG. 2 is a time graph representation of the outputs of a subtracting device of the camshaft revolution sensing assembly of FIG. 1.
Figure 3:
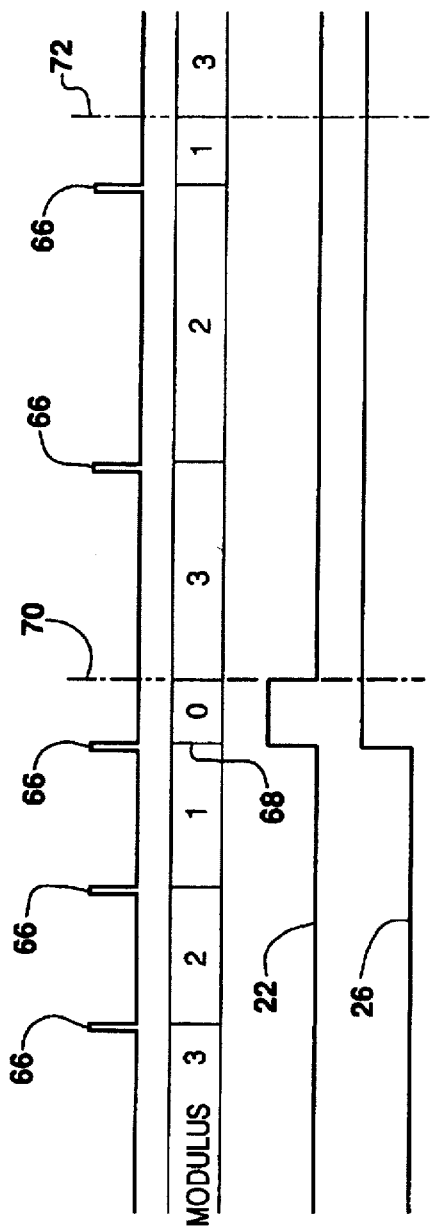
FIG. 3 is time graph representation of the outputs of an alternative embodiment of a camshaft revolution sensing assembly, according to the present invention.

The camshaft revolution sensing assembly 10 further includes a signal generator 18. The signal generator 18 is operatively connected to the subtracting device 14. The signal generator 18 generates a signal indicating the subtracting device 14 has subtracted to a predetermined value. In one embodiment, the predetermined value is zero (0). Because the signal generator 18 is potentially receiving signals from more than one signal source, the signal generator 18 includes a multiplexer 20 which outputs at least two output signals. In the embodiment shown in FIG. 1, the multiplexer 20 is a sixteen to two multiplexer. The multiplexer 20 outputs a synchronization input (SI) signal 22, as best seen in FIGS. 2 and 3, at a first output port 24. The multiplexer 20 also outputs a backup signal having limited resolution based on a camshaft derived angular reference (CAR) 26, as best seen in FIGS. 2 and 3, from a second output port 28. Based on the inputs shown in FIG. 1, the multiplexer 20 is capable of selecting one of eight different synchronization modes to match the sensor signal type to get a consistent internal signal indicating the camshaft revolution.

More specifically, the first and last inputs of the eight potential synchronization modes are override inputs and are a constant zero because the input port 30 for the first and eight modes are connected to zero volts. The inputs are used at times when the controlling logic (not shown) is programmed to override the inputs received by any sensors. This may occur during start-up periods or when it may be determined that a particular sensor is not working properly.

This list of reasons is non-exhaustive as there may be other situations when it may be desirable to override the inputs received from a particular sensor. The input port 32, also an override port, connected to the second mode, is a constant logic one or high input as it connected to a constant voltage source $V_{dd}$. As stated above, the second mode input is used when it has been determined that overriding the input from the sensors is required to maintain functionality of the internal combustion engine. The third input port 34 is connected to the camshaft sensor 12 which, in an alternative embodiment, is a Hall effect type sensor. Therefore, the input port 34 is a high level only when the camshaft sensor 12 senses the first revolution. The fourth input port 36 is connected to the camshaft sensor 12 through a NOT gate 38. The direct connections of the third and fourth input ports 34,36 (ignoring the NOT gate 38) allows a sensor whose output does not have to be overly conditioned to be input directly into the multiplexer 20. Therefore, a separate and distinct third sensor (not shown) may be connected to the third and fourth input ports 34,36. In the embodiment shown in FIG. 1, however, a high input at the fourth input port 34 indicates the camshaft is in the second revolution. The fifth input port 40 is received by the subtracting device 14 wherein more pulses at the fourth input port 40 indicates a first revolution. A sixth input port 42 is also receiving a signal from the subtracting device 14. At the sixth input port 42, receipt of a high number of pulses indicates the second revolution. The seventh input port 44 is connected directly to the second input port 16 and a logic low or zero. This allows internal tracking of the camshaft once the circuit is initiated. The multiplexer 20 also includes synchronization mode input port 46.

The subtracting device 14, providing inputs to the fifth input port 40 and the sixth input port 42, receives inputs from the outputs of the camshaft sensor 12 and what is received by the second input port 16. The subtracting device 14 includes a memory device 48 which stores a modulus, a number, greater than the predetermined value. The subtracting device 14 further includes a subtractor 50 which subtracts from the modulus until it reaches the predetermined value. The output of the subtractor 50 is a direct input to the fifth input port 40 of the multiplexer 20. The output of the subtractor 50 is also connected to a flip flop 52 through a second NOT gate 54. In one embodiment the flip flop 52 is a negative edge triggered T flip flop. The output of the flip flop 52 is the input of both the fifth input port 40 and the sixth input port 42 of the multiplexer 20. The output of the subtractor 50 also creates a feedback loop 56, once it passes through the NOT gate 54, where it is an input for a gate 58. Once the subtractor 50 reaches zero, the gate 58 is turned on to stop the subtractor 50 from continuing the subtraction portion of the operation. The subtracting device 14 further includes an edge detector 60 which receives an input from the second input port 16 and provides an output to a second gate 62. The edge detector 60 operates the second gate 62 to download to the subtractor 50 the modulus stored in the memory 48.

Referring to FIG. 2, a time graph representation of the outputs of sensors are indicated. More specifically, the camshaft sensor 12 has an output indicated at 65. The output is a plurality of steps with each step indicating the rotation of a tooth past the camshaft sensor 12. In FIG. 2 wherein the modulus equals one (1), the variable reluctant sensor, i.e., the camshaft sensor 12, creates an output signal 65 with a portion or step thereof greater than zero (0) at 66. When the VRS signal 65 is greater than zero, at 66, the subtractor 50 subtracts one (1) from one (1) to reach zero (0) at 68. As may be seen by viewing the VRS signal 65 between the dashed lines 70,72, the VRS signal 65 does not rise above zero and, therefore, the subtracter 50 does not subtract to zero. The SI signal 22 goes from a logic 0 to logic 1 when the subtracter 50 subtracts to zero. The CAR signal 26 also changes from a logic low to a logic high when the subtracter 50 subtracts to zero. The difference between the SI signal 22 and the CAR signal 26 is that the SI signal 22 returns to a logic low when the modulus, one (1) in this embodiment, is reloaded into the subtracter 50 indicating the second input port 16 receives a signal indicating that a new revolution is beginning, as detected by the edge detector 60. Unlike the SI signal 22, the CAR signal 26 does not return to a logic low.

Referring to FIG. 3, wherein the modulus equals three (3), it is shown that, like the example in FIG. 2, the SI signal 22 changes from a logic low to a logic high when the subtractor 50, reduces the modulus to zero. The SI signal 22 returns to a logic low when the subtractor 50 is reloaded with the modulus, three in this example, from the memory 48 when the edge detector 60 detects the start of a new revolution from the second input port 16. Also, like the example shown in FIG. 2, the CAR signal 26 does not return to a logic low at the reloading of the subtractor 50. In both examples, the CAR signal 26 will return to a logic low when the subtractor 50 subtracts the modulus to zero, the predetermined value in one embodiment.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A camshaft revolution sensing assembly for identifying a revolution of a camshaft, having a plurality of teeth, of an internal combustion engine of an automotive vehicle, said camshaft revolution sensing assembly comprising:

a camshaft sensor sensing revolutions of the camshaft by sensing each of the teeth as each rotates therepast and producing a camshaft output;

a subtracting device operatively connected to said camshaft sensor, said subtracting device subtracting each time said camshaft sensor senses a tooth rotating therepast, said subtracting device including a memory device to store a modulus greater than a predetermined value;

at least one override port to receive an override signal to override the camshaft output when said camshaft sensor is not operating; and a signal generator operatively connected to said subtracting device, said signal generator generating a signal indicating the specific revolution of the camshaft when said subtracting device has subtracted to said predetermined value.

2. A camshaft revolution sensing assembly as set forth in claim 1 wherein said signal generator includes a multiplexer.

3. A camshaft revolution sensing assembly as set forth in claim 2 wherein said multiplexer includes at least two outputs.

4. A camshaft revolution sensing assembly as set forth in claim 3 wherein said multiplexer produces at least two output signals.

5. A camshaft revolution sensing assembly as set forth in claim 1 wherein said subtracting device includes a subtractor for subtracting from said modulus.

6. A camshaft revolution sensing assembly as set forth in claim 5, wherein said subtracting device includes a flip flop operatively connected between an output of said subtractor and an input of said signal generator.

7. A camshaft revolution sensing assembly as set forth in claim 1 including an input port for receiving an input signal independent of said camshaft output.

8. A camshaft revolution sensing assembly as set forth in claim 1 wherein said subtracting device includes an edge detector operatively connected between said input port and said subtractor.

9. A camshaft revolution sensing assembly as set forth in claim 8 wherein said subtracting device includes a gate electrically connected between said memory device, said edge detector, and said subtractor.

10. A camshaft revolution sensing assembly for identifying a revolution of a camshaft, having a plurality of teeth therearound, of an internal combustion engine of an automotive vehicle, said camshaft revolution sensing assembly comprising:

a camshaft sensor sensing revolution of the camshaft by sensing each of the teeth as each of the teeth rotate therepast and producing a camshaft sensor output;

a subtracting device having first and second input ports operatively connected to said camshaft sensor, said subtracting device subtracting each time said camshaft sensor senses each of the teeth rotating therepast, said subtracting device including a memory device to store a modulus greater than a predetermined value; and a signal generator, including a multiplexer, operatively connected to said subtracting device, said signal generator generating a signal indicating the specific revolution of the camshaft when said subtracting device has subtracted to said predetermined value, said multiplexer producing at least two output signals.

\* \* \* \* \*